United States Patent

[11] 3,612,370

| [72] | Inventor | Louis Thevenaz |
| | | Les Rasses, Switzerland |
| [21] | Appl. No. | 860,668 |
| [22] | Filed | Sept. 24, 1969 |
| [45] | Patented | Oct. 12, 1971 |
| [73] | Assignee | Paillard S. A. |
| | | Sainte-Croix, Vaud, Switzerland |
| [32] | Priority | Sept. 27, 1968 |
| [33] | | Switzerland |
| [31] | | 14584/68 |

[54] INTERMITTENT DRIVE MECHANISM FOR CINEMATOGRAPHIC FILM
4 Claims, 5 Drawing Figs.

[52] U.S. Cl. .................................................. 226/51, 226/65
[51] Int. Cl. ...................................................... G03b 1/22
[50] Field of Search .......................................... 226/51, 62, 64, 65, 66, 67, 68, 69, 70, 73; 252/194, 196

[56] References Cited
UNITED STATES PATENTS

| 2,152,624 | 4/1939 | Cazes | 226/73 |
| 2,168,771 | 8/1939 | Howell | 226/65 |
| 2,384,597 | 9/1945 | Calvin et al. | 226/73 |
| 2,484,348 | 10/1949 | Kellogg et al. | 226/65 |
| 2,612,075 | 9/1952 | Kellogg et al. | 226/65 X |
| 2,893,287 | 7/1959 | Lunzer | 352/196 |

Primary Examiner—Allen N. Knowles
Attorneys—Emory L. Groff and Emory L. Groff, Jr.

ABSTRACT: An intermittent drive device for the film engaging claw of a cinematographic projector mechanism includes a first cam profile providing movements of the claw in the forward and reverse direction of the film and second and third cam profiles driving the penetrating movements of the claw relative to the perforations in the film. Each of the cam profiles is rotatably driven by the shaft of the projector motor and a plunger member which transmits the film penetrating movements to said claw is selectively displaceable to cooperate with either the second or third cam profiles. The second and third cam profiles are offset relative to the first cam profile and one of the second and third profiles causes the penetration of the claw before its displacement in the direction of advancing of the film and also causes retraction of the claw before displacement thereof in the reverse direction. The other of said second and third cam profiles causes penetration of the claw before its displacement in the reverse direction of the advance of the film, and its retraction before its displacement in the direction of advance of the film.

INVENTOR
LOUIS THEVENAZ
BY
ATTORNEY

INVENTOR

LOUIS THEVENAZ

BY  Emory L. Groff Jr.

ATTORNEY

INTERMITTENT DRIVE MECHANISM FOR CINEMATOGRAPHIC FILM

Drive devices with one or more claws for engaging a film in a cinematographic projector are well known. Some of these devices comprise means which make it possible to obtain a normal, a fast or a slow movement of the film and in some cases permit stopping the film on a particular frame. Speed variations are produced while running the film forward or in reverse without a noticeable reduction in the lighting or an increase in flickering.

Such devices generally have the disadvantage of being complicated, because they comprise several sets of claws and a multiplicity of cams controlling the movements of the film advance and penetration of the claws into the perforations in the film. Moreover, insofar as certain mechanisms are concerned, running of the film in reverse can be controlled without reversal of the direction of rotation of the drive cams, but does necessitate drive means with an angular displacement between the shutter and the claw drive cams.

The present invention remedies the disadvantages set forth above, and its primary object is to provide by simple means which is reliable in operation, a film drive mechanism with a single claw, the drive of the claw permitting driving the film forward or backward without reversing the direction of rotation of the motor shaft, and without resorting to an angular displacement of the shutter, while making possible, for both forward and backward movement of the film, the changing from a normal speed to a slower speed for advancing of the film.

The present invention is directed to an intermittent film entrainment device in a cinematographic projector comprising: a claw insuring the movement of the film, a first cam profile providing the claw movements in the forward direction of the film, and also in the reverse direction, and second and third cam profiles driving the penetrating movement of the claw. Each of the three cam profiles is solid in rotation with one another and a member which transmits the penetrating movements to the claw is displaceable selectively to cooperate as desired with either the second or the third cam profile. This mechanism is characterized in that the second and third cam profiles are offset with respect to the first cam profile. One of the second and third profiles causes the penetration of the claw before its displacement in the direction advancing the film, and also causes its retraction before the displacement of the claw in the reverse direction. The other cam profile effects the penetration of the claw before its displacement in the reverse direction of the advance of the film, and its retraction before its displacement in the direction of advance of the film.

The attached drawing shows, schematically and by way of example, a preferred form of execution of the invention.

Figure 1:
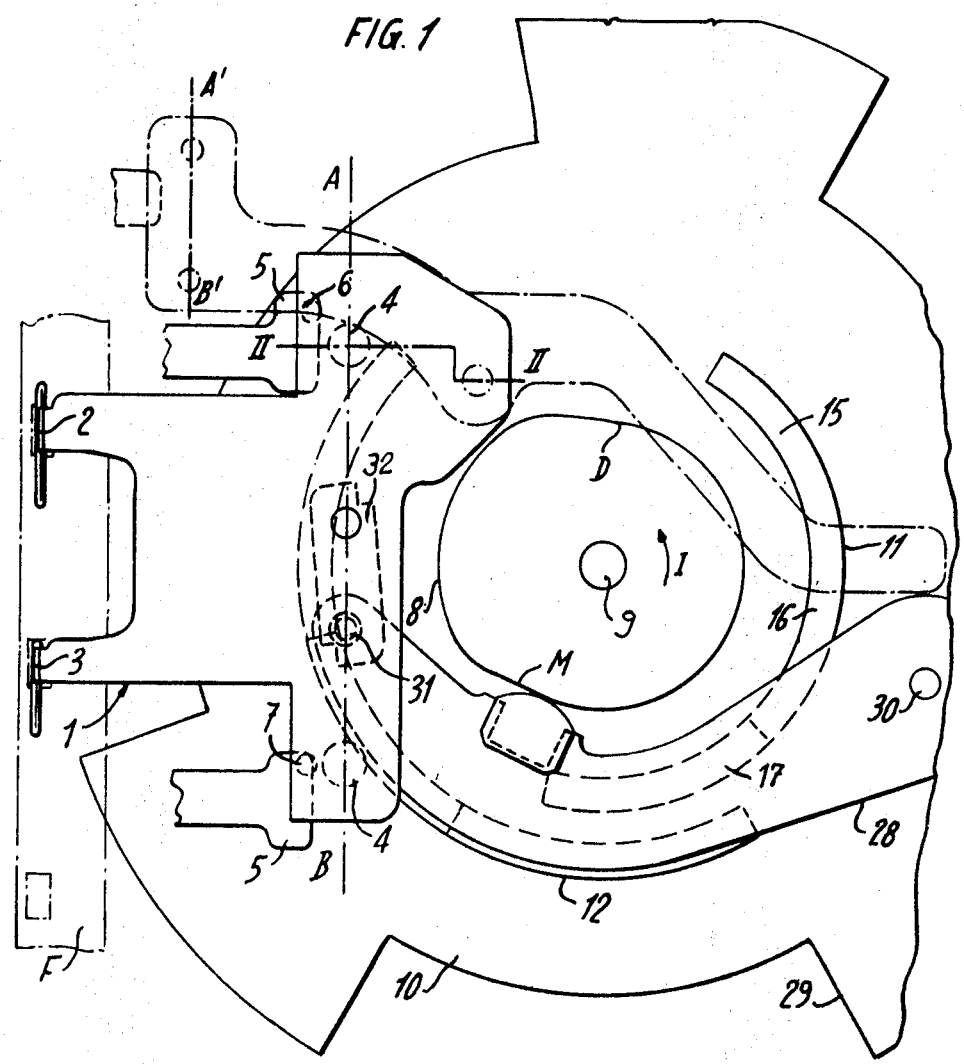
FIG. 1 is an elevation of the film entrainment mechanism.

The mechanism shown in the drawings comprises, principally, a claw 1 driven by a cam unit comprising a transportation cam 8 and a penetration cam 10, said unit being rotatably driven in the direction of arrow I by the motor shaft 9 of the projector.

The claw 1 is provided with two points, 2, 3 for the entrainment of film F, and is subject to two movements, namely a rectilinear oscillating movement along axis A–B as it is driven by the transportation cam 8 to insure advancement of the film and a rotating movement around the axis A–B to insure the penetration and retraction of points 2 and 3 in the perforations of the film as it is driven by the penetration cam 10.

Figure 3:
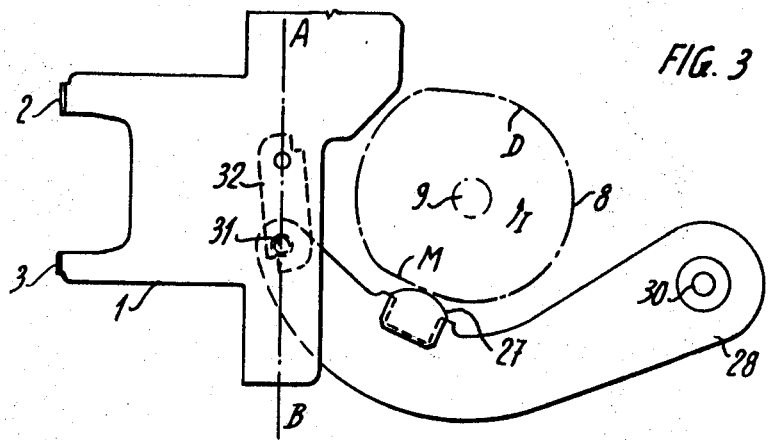
FIG. 3 is a detail view on a larger scale, illustrating the drive of the oscillating movement of the claw.

The oscillating movements, or the rise and fall of the claw 1, correspond to the pitch of the film. As shown in FIG. 3, these movements are driven by transportation cam 8 engaging a shoe 27 of a lever 28 subjected to the action of a spring, not shown. Lever 28, pivoted at 30, transmits its movement to claw 1 through a pin 31, integral with said lever and cooperating with a link 32 pivotally mounted on claw 1.

Figure 2:
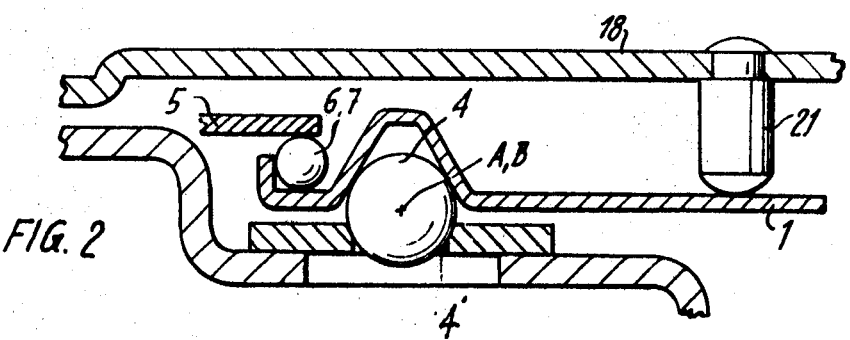
FIG. 2 is a section on a larger scale along II—II of FIG. 1.

Claw 1 is bent, as shown in FIG. 2, in such a way as to form a V-shaped groove cooperating with balls 4 engaged in holes 4' in a support, and against which said claw is held by means of a spring 5 and a pair of balls 6, 7. Due to this arrangement, the claw 1 can be displaced longitudinally along axis A–B and at the same time can pivot around the axis by an amount corresponding to the penetration into the perforations of film F and to the retraction of points 2 and 3.

Penetration cam 10 includes two tracks 11, 12 which drive the penetration and retraction movement of the claw in forward and reverse movement, respectively, and comprises a flat disc of metal or plastic material, such as nylon integral with shutter 29 of the projection apparatus. The two tracks 11, 12 are formed in the flat face of the cam 10 opposite the face on the shutter side and comprise two concentric grooves of different radii extending arcuately over a part of the said flat face.

Figure 4:
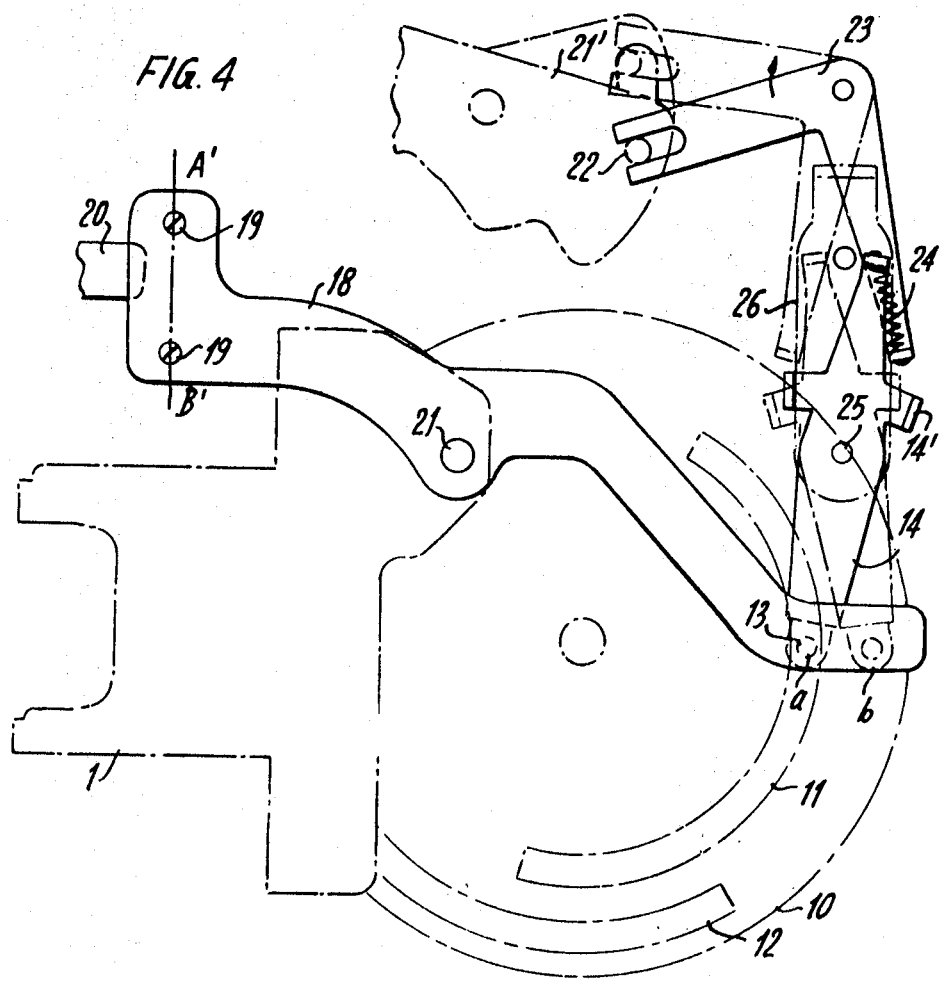
FIG. 4 is a detail view on a larger scale illustrating the drive of the movement of penetration of the claw, as well as the drive of the forward-backward shift movement.

Referring to FIG. 4, a plunger 13 carried by a lever 14 can be interposed between either of tracks 11 and 12 and a lever 18 pivoting around an axis A'–B' on two pointed screws 19 engaged in two suitable openings in lever 18, which is also subjected to the action of a flat spring 20. Lever 18 transmits the alternating movement of plunger 13 to the claw by means of a pin 21 integral with said lever. The face of claw 1 cooperating with said pin 21 slides over the latter during the rise and fall of the claw without affecting the pattern of penetration and retraction of the claw. The depth of penetration of points 2 and 3 can be adjusted by rotation of the pointed screws 19.

Tracks 11 and 12 control the penetration and retraction of the claw in both forward and reverse operation, respectively, according to whether plunger 13 occupies position a in the groove forming track 11, or position b in the groove forming track 12. Each of said tracks has an entry ramp 15, an intermediate ramp 16 parallel to the face of cam 10 and a retraction ramp 17. The claw 1 is retracted from the perforation in the film when plunger 13 slides over the front face of cam 10.

It should be noted that the two tracks 11, 12 have the same profile, but are offset in such a way that the points of claw 2 and 3 are engaged with the perforations of the film during the descent of the claw for the forward operation, and during the rise of the claw in reverse operation. The offset of the two tracks 11, 12 must therefore correspond to that of the two ramps M and D of cam 8.

The shift to reverse operation, namely the shift of plunger 13 from position a in track 11 to position b in track 12, is accomplished by means of a lever device driven by a commutation key 21' carrying a pin 22 as shown in FIG. 4. When key 21' is actuated, pin 22 engages one end of a lever 23. By means of a spring 24, attached at one of its ends to the opposite end of the lever 23, and attached at its other end to the end of lever 14 carrying plunger 13, lever 14 rocks from position a to position b. Lever 14 pivots around pin 25 integral with another lever 26, whose function will be explained later. The extreme positions of lever 14 are determined by stops 14', cooperating with the edges of lever 26.

The resilient connection between levers 23 and 14 makes it possible to actuate the commutation key 21' even while plunger 13 is in either of the grooves 11 and 12 of cam 10 with no risk of locking the mechanism.

The mechanism according to the invention also includes means for driving the film F at a slower speed, for example, at a speed of 6 frames per second. This mechanism, shown in FIG. 5, comprises a cam 39 mounted on a pivot 40, said cam is rotatably driven from the motor shaft 9 by means of a pulley 41 integral with the pivot 40 and a notched belt 42. The reduction ratio between pulley 41 and a pulley not shown, carried by the motor shaft 9, is one-third, for example, in the event the entrainment speed of the film is to be reduced from 18 to 6 frames per second. The cam 39 is designed to cooperate with the pin 25 on lever 26 at the time when a speed commutation button 33 is actuated.

Figure 5:
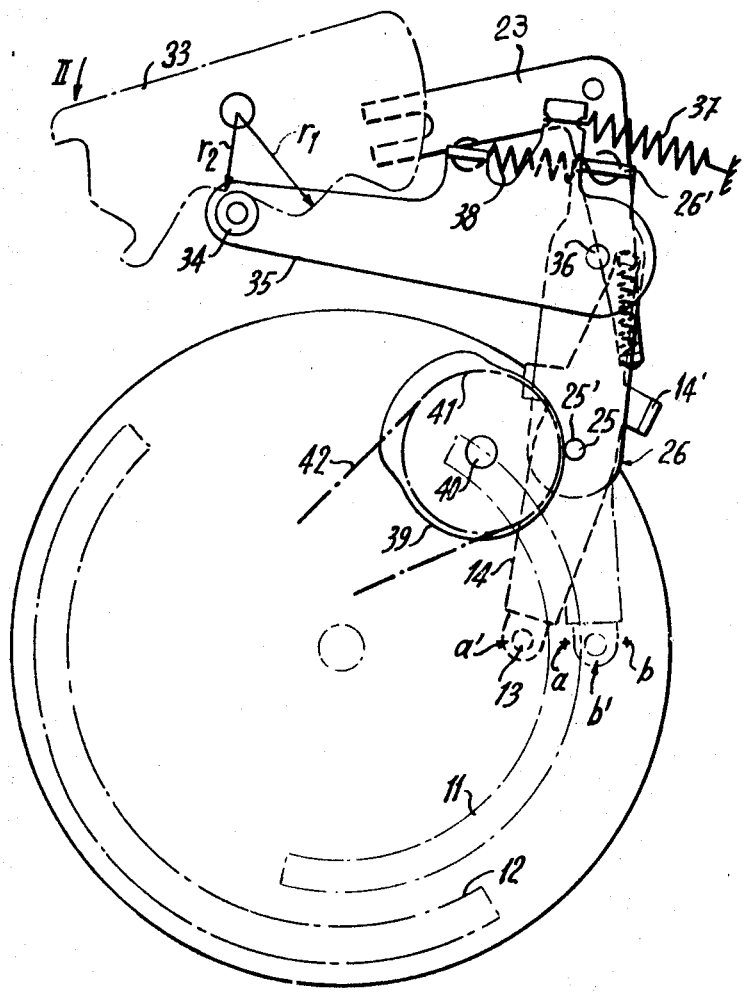
FIG. 5 is a detail view on a larger scale, illustrating the slow-down drive.

The mechanism insuring the shift to a slower advancement speed of the film functions as follows:

When the commutation button 33 and levers 35 and 26 are in the position shown in FIG. 5, which corresponds to the normal speed of passage of the film, for example, 18 frames per second, pin 25 does not cooperate with cam 39. When the button 33 is pushed in the direction of arrow II, it pivots around its axis and permits a pin 34, integral with lever 35, which oscillates under the influence of spring 37 in a clockwise direction, to leave the sector of radius $r_1$ of button 33 and enter the sector of radius $r_2$ of the button.

The two levers 26, 35 are held together in a given angular position by spring 38. By means of stop 26', lever 35 engages lever 26 in such a way that the pin 25 will cooperate up to point 25' with cam 39, lever 14 also being entrained by lever 26 on which it is pivoted. Thus, plunger 13 occupies position $a'$ in which it cooperates with the plane face of the cam, and is no longer actuated. In this position, plunger 13 therefore no longer cooperates with ramps 15, 16 and 17 for a period of two rotations of cam 8, since the reduction ratio between axes of shaft 9 and pivot 40 is one-third. Cam 39 is keyed on its shaft with respect to cam 8 in such a way that at each third revolution of the latter, the projecting part of cam 39 repels the finger integral with lever 26 from 25' to 25, so that plunger 13 again cooperates with ramps 15, 16, 17 to cause the penetration of claw points 2 and 3, which penetration was halted during the two preceding revolutions of cams 8 and 10.

Thus, for three oscillating movements of claw 1, the penetration is eliminated twice, which means that the speed of advancement of the film is reduced from 18 to 6 frames per second.

The reduction from 18 to 6 frames per second is obtained in the same way for reverse operation when lever 23 is acted upon, plunger 13 then being displaced from $b$ to $b'$ by cam 33.

The slowdown device has high flexibility and high operating reliability because it permits shifting from one speed of driving the film to another, even when plunger 13 is engaged in one of ramps 15, 16, 17 of tracks 11 and 12.

The film entrainment mechanism described makes it possible to obtain, in simple fashion, precise movement of the claw into the perforations of the film due to the fact that the transportation cam 8 and the penetration cam 10, which form a single cam unit, are always solid in rotation and, on the other hand, neither the axial position of this cam unit, nor the axis of pivoting of the claw are changed, either for forward or backward operation.

There can, of course, be provided a drive lever which makes it possible to act on arm 14 in such a way so as to place it continuously between the two tracks 11, 12 in order to obtain stoppage on a particular frame.

I claim:

1. A mechanism for the intermittent drive of film in a cinematographic projector including a motor shaft (9), a claw (1) insuring the movement of the film (F) by engaging perforations therein, a first cam profile (8) effecting the movements of the claw (1) in the direction of advancement of the film (F) and also in a reverse direction, a second and a third cam profile (11, 12) driving the penetration movements of the claw, said three cam profiles being solid in rotation with one another, means for transmitting to said claw said penetration movements, said means being displaceable selectively to cooperate with the second or with the third cam profile, characterized in that the second and third cam profiles (11, 12) are offset with respect to the first cam profile (8), one of said second and third profiles (11, 12) insuring the penetration of claw (1) into said perforations before its displacement in the direction of advancement of the film (F) and its retraction before the displacement of claw (1) in the opposite direction, the other cam profile insuring the penetration of the claw (1) before its displacement in the reverse direction to the advancement of the film (F) and its retraction prior to its displacement in the direction of advance of said film (F).

2. A mechanism according to claim 1, wherein said three cam profiles (8, 11, 12) are on one and the same cam unit (8, 10) and are rotatably driven by the motor shaft (9).

3. A mechanism according to claim 2, wherein the means for transmitting the penetration movements of said claw comprise a plunger (13) which can be placed selectively between said second (11) and third (12) cam profiles, in such a way as to disengage claw (1) from the perforations in the film (F), and insure stopping the film on a particular frame.

4. A mechanism according to claim 3, including an additional cam (39) for slow speeds, said cam rotatably driven by the motor shaft (9) in a reduction ratio corresponding to the desired reduction in speed, and which acts on the displacements of the said plunger (13) to place it intermittently out of the path of the second and third cam profiles (11, 12).